(12) United States Patent
DeCusatis et al.

(10) Patent No.: US 8,416,834 B2
(45) Date of Patent: Apr. 9, 2013

(54) SPREAD SPECTRUM WIRELESS COMMUNICATION CODE FOR DATA CENTER ENVIRONMENTS

(75) Inventors: Casimer M. DeCusatis, Poughkeepsie, NY (US); Rajaram B. Krishnamurthy, Wappingers Falls, NY (US); Michael Onghena, Poughquag, NY (US); Anuradha Rao, Hopewell Junction, NY (US); Brian J. Neugebauer, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/821,222

(22) Filed: Jun. 23, 2010

(65) Prior Publication Data

US 2011/0317743 A1    Dec. 29, 2011

(51) Int. Cl.
*H04B 1/00* (2006.01)

(52) U.S. Cl. ........ 375/130; 375/260; 375/272; 375/285; 375/343; 375/347; 375/262; 375/267

(58) Field of Classification Search ............ 375/130, 375/140, 260, 262, 267, 272, 285, 343, 347; 370/203, 204, 205, 208, 209, 210; 327/164; 455/42, 43, 44, 45, 110, 111, 112, 113
See application file for complete search history.

(56) References Cited

U.S. PATENT DOCUMENTS

| | | |
|---|---|---|
| 4,104,539 A | 8/1978 | Hase |
| 4,611,319 A | 9/1986 | Naito |
| 4,644,443 A | 2/1987 | Swensen et al. |
| 5,027,254 A | 6/1991 | Corfits et al. |
| 5,170,472 A | 12/1992 | Cwiakala et al. |
| 5,282,274 A | 1/1994 | Liu |
| 5,430,856 A | 7/1995 | Kinoshita |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |

(Continued)

FOREIGN PATENT DOCUMENTS

| | | |
|---|---|---|
| JP | 57191826 | 11/1982 |
| JP | 5981724 | 5/1984 |

(Continued)

OTHER PUBLICATIONS

Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.

(Continued)

*Primary Examiner* — Dhaval Patel
(74) *Attorney, Agent, or Firm* — Cantor Colburn LLP; Steven Chiu

(57) ABSTRACT

A technique for wirelessly transmitting management data without cables in a data center is provided. Management data is obtained at a device in the data center. A wireless management data signal is generated from the management data. The wireless management data signal is configured to be transmitted at frequencies matching an ambient electromagnetic noise emitted by the data center, such that the wireless management data signal is masked in the ambient electromagnetic noise emitted by the data center. The wireless management data signal is wirelessly transmitted to another device.

10 Claims, 8 Drawing Sheets

U.S. PATENT DOCUMENTS

| | | | |
|---|---|---|---|
| 5,568,365 | A | 10/1996 | Hahn et al. |
| 5,574,873 | A | 11/1996 | Davidian |
| 5,600,805 | A | 2/1997 | Fredericks et al. |
| 5,617,554 | A | 4/1997 | Alpert et al. |
| 5,663,919 | A | 9/1997 | Shirley et al. |
| 5,742,785 | A | 4/1998 | Stone et al. |
| 5,761,448 | A | 6/1998 | Adamson et al. |
| 5,790,825 | A | 8/1998 | Traut |
| 5,838,960 | A | 11/1998 | Harriman, Jr. |
| 5,870,598 | A | 2/1999 | White et al. |
| 5,949,646 | A | 9/1999 | Lee et al. |
| 5,960,213 | A | 9/1999 | Wilson |
| 5,963,425 | A | 10/1999 | Chrysler et al. |
| 6,009,261 | A | 12/1999 | Scalzi et al. |
| 6,023,736 | A | 2/2000 | Lambeth et al. |
| 6,067,595 | A | 5/2000 | Lindenstruth |
| 6,112,311 | A | 8/2000 | Beardsley et al. |
| 6,205,530 | B1 | 3/2001 | Kang |
| 6,301,133 | B1 | 10/2001 | Cuadra et al. |
| 6,308,255 | B1 | 10/2001 | Gorishek, IV et al. |
| 6,330,656 | B1 | 12/2001 | Bealkowski et al. |
| 6,341,064 | B1 | 1/2002 | Bradley |
| 6,349,380 | B1 | 2/2002 | Shahidzadeh et al. |
| 6,362,942 | B2 | 3/2002 | Drapkin et al. |
| 6,408,347 | B1 | 6/2002 | Smith et al. |
| 6,456,498 | B1 | 9/2002 | Larson et al. |
| 6,523,140 | B1 | 2/2003 | Arndt et al. |
| 6,538,881 | B1 | 3/2003 | Jeakins et al. |
| 6,544,311 | B1 | 4/2003 | Walton et al. |
| 6,594,148 | B1 | 7/2003 | Nguyen et al. |
| 6,595,018 | B2 | 7/2003 | Goth et al. |
| 6,625,169 | B1 | 9/2003 | Tofano |
| 6,625,648 | B1 | 9/2003 | Schwaller et al. |
| 6,643,727 | B1 | 11/2003 | Arndt et al. |
| 6,658,599 | B1 | 12/2003 | Linam et al. |
| 6,721,813 | B2 | 4/2004 | Owen et al. |
| 6,816,590 | B2 | 11/2004 | Pike et al. |
| 6,845,428 | B1 | 1/2005 | Kedem |
| 6,927,975 | B2 | 8/2005 | Crippen et al. |
| 6,950,438 | B1 | 9/2005 | Owen et al. |
| 6,973,510 | B2 | 12/2005 | Arndt et al. |
| 7,003,615 | B2 | 2/2006 | Chui et al. |
| 7,004,233 | B2 | 2/2006 | Hasegawa et al. |
| 7,007,099 | B1 | 2/2006 | Donati et al. |
| 7,032,052 | B2 | 4/2006 | Sauber et al. |
| 7,042,734 | B2 | 5/2006 | Hensley et al. |
| 7,053,502 | B2 | 5/2006 | Aihara et al. |
| 7,062,594 | B1 | 6/2006 | Sardella et al. |
| 7,075,788 | B2 | 7/2006 | Larson et al. |
| 7,093,155 | B2 | 8/2006 | Aoki |
| 7,096,308 | B2 | 8/2006 | Main et al. |
| 7,107,331 | B2 | 9/2006 | Gava et al. |
| 7,107,495 | B2 | 9/2006 | Kitamorn et al. |
| 7,134,040 | B2 | 11/2006 | Ayres |
| 7,152,136 | B1 | 12/2006 | Charagulla |
| 7,163,546 | B2 | 1/2007 | Mirizzi et al. |
| 7,206,946 | B2 | 4/2007 | Sakakibara et al. |
| 7,219,181 | B2 | 5/2007 | Carty |
| 7,260,620 | B1* | 8/2007 | Halasz ............ 709/220 |
| 7,313,643 | B2 | 12/2007 | Sakurai et al. |
| 7,370,224 | B1 | 5/2008 | Jaswa et al. |
| 7,457,900 | B2 | 11/2008 | Panesar |
| 7,464,174 | B1 | 12/2008 | Ngai |
| 7,478,167 | B2 | 1/2009 | Ould-Brahim et al. |
| 7,480,303 | B1 | 1/2009 | Ngai |
| 7,519,647 | B2 | 4/2009 | Carlough et al. |
| 7,525,957 | B2 | 4/2009 | Scherer et al. |
| 7,535,828 | B2 | 5/2009 | Raszuk et al. |
| 7,546,386 | B2 | 6/2009 | Arndt et al. |
| 7,558,348 | B1* | 7/2009 | Liu et al. ............ 375/346 |
| 7,565,463 | B2 | 7/2009 | Johnsen et al. |
| 7,613,847 | B2 | 11/2009 | Kjos et al. |
| 7,617,340 | B2 | 11/2009 | Gregg |
| 7,617,345 | B2 | 11/2009 | Clark et al. |
| 7,624,235 | B2 | 11/2009 | Wadhawan et al. |
| 7,627,723 | B1 | 12/2009 | Buck et al. |
| 7,631,097 | B2 | 12/2009 | Moch et al. |
| 7,660,912 | B2 | 2/2010 | Gregg |
| 7,676,617 | B2 | 3/2010 | Kloeppner |
| 7,729,316 | B2 | 6/2010 | Uhlik |
| 7,836,254 | B2 | 11/2010 | Gregg et al. |
| 7,873,851 | B1 | 1/2011 | Linnell et al. |
| 7,975,076 | B2 | 7/2011 | Moriki et al. |
| 8,032,684 | B2 | 10/2011 | Pettey et al. |
| 8,041,811 | B2 | 10/2011 | Calippe et al. |
| 8,046,627 | B2 | 10/2011 | Takubo |
| 8,082,466 | B2 | 12/2011 | Tanaka et al. |
| 2002/0112067 | A1 | 8/2002 | Chang et al. |
| 2003/0056155 | A1 | 3/2003 | Austen et al. |
| 2003/0058618 | A1 | 3/2003 | Soetemans et al. |
| 2003/0097503 | A1 | 5/2003 | Huckins |
| 2003/0177221 | A1 | 9/2003 | Ould-Brahim et al. |
| 2003/0198180 | A1 | 10/2003 | Cambron |
| 2003/0200477 | A1 | 10/2003 | Ayres |
| 2004/0024905 | A1 | 2/2004 | Liao et al. |
| 2004/0117534 | A1 | 6/2004 | Parry et al. |
| 2004/0130868 | A1 | 7/2004 | Schwartz et al. |
| 2004/0133819 | A1 | 7/2004 | Krishnamurthy et al. |
| 2004/0136130 | A1 | 7/2004 | Wimmer et al. |
| 2004/0199700 | A1 | 10/2004 | Clayton |
| 2005/0024187 | A1 | 2/2005 | Kranz et al. |
| 2005/0033895 | A1 | 2/2005 | Lueck et al. |
| 2005/0071472 | A1 | 3/2005 | Arndt et al. |
| 2005/0091438 | A1 | 4/2005 | Chatterjee |
| 2005/0116546 | A1 | 6/2005 | Zeighami et al. |
| 2005/0146855 | A1 | 7/2005 | Brehm et al. |
| 2005/0160214 | A1 | 7/2005 | Sauber et al. |
| 2005/0162830 | A1 | 7/2005 | Wortman et al. |
| 2005/0182862 | A1 | 8/2005 | Ritz et al. |
| 2005/0213513 | A1 | 9/2005 | Ngo et al. |
| 2005/0276017 | A1 | 12/2005 | Aziz et al. |
| 2005/0286187 | A1 | 12/2005 | Liu et al. |
| 2005/0289271 | A1 | 12/2005 | Martinez et al. |
| 2005/0289278 | A1 | 12/2005 | Tan et al. |
| 2006/0067069 | A1 | 3/2006 | Heard et al. |
| 2006/0085150 | A1* | 4/2006 | Gorin ............ 702/69 |
| 2006/0085573 | A1 | 4/2006 | Pike et al. |
| 2006/0087813 | A1 | 4/2006 | Becker et al. |
| 2006/0087814 | A1 | 4/2006 | Brandon et al. |
| 2006/0095607 | A1 | 5/2006 | Lim et al. |
| 2006/0195644 | A1 | 8/2006 | Arndt et al. |
| 2006/0206639 | A1 | 9/2006 | Tee et al. |
| 2006/0230208 | A1 | 10/2006 | Gregg et al. |
| 2006/0236054 | A1 | 10/2006 | Kitamura |
| 2006/0253619 | A1 | 11/2006 | Torudbakken et al. |
| 2006/0288130 | A1 | 12/2006 | Madukkarumukumana et al. |
| 2006/0291447 | A1 | 12/2006 | Siliquini et al. |
| 2007/0008663 | A1 | 1/2007 | Nakashima et al. |
| 2007/0069585 | A1 | 3/2007 | Bosco et al. |
| 2007/0073955 | A1 | 3/2007 | Murray et al. |
| 2007/0078996 | A1 | 4/2007 | Chen et al. |
| 2007/0136554 | A1 | 6/2007 | Biran et al. |
| 2007/0168636 | A1 | 7/2007 | Hummel et al. |
| 2007/0183393 | A1 | 8/2007 | Body et al. |
| 2007/0186074 | A1 | 8/2007 | Bradford et al. |
| 2007/0211430 | A1 | 9/2007 | Bechtolsheim |
| 2007/0226386 | A1 | 9/2007 | Sharp et al. |
| 2007/0226523 | A1 | 9/2007 | Chang |
| 2007/0234018 | A1 | 10/2007 | Feiste |
| 2007/0239925 | A1 | 10/2007 | Koishi |
| 2007/0245041 | A1 | 10/2007 | Hua et al. |
| 2007/0271559 | A1 | 11/2007 | Easton et al. |
| 2007/0273018 | A1 | 11/2007 | Onozuka et al. |
| 2007/0274039 | A1 | 11/2007 | Hamlin |
| 2008/0043405 | A1 | 2/2008 | Lee et al. |
| 2008/0065796 | A1 | 3/2008 | Lee et al. |
| 2008/0091851 | A1 | 4/2008 | Sierra |
| 2008/0091868 | A1 | 4/2008 | Mizrachi et al. |
| 2008/0091915 | A1 | 4/2008 | Moertl et al. |
| 2008/0114906 | A1 | 5/2008 | Hummel et al. |
| 2008/0126648 | A1 | 5/2008 | Brownlow et al. |
| 2008/0126652 | A1 | 5/2008 | Vembu et al. |
| 2008/0147943 | A1 | 6/2008 | Freimuth et al. |
| 2008/0148295 | A1 | 6/2008 | Freimuth et al. |
| 2008/0162865 | A1 | 7/2008 | Koufaty et al. |
| 2008/0168208 | A1 | 7/2008 | Gregg |
| 2008/0189577 | A1 | 8/2008 | Arndt et al. |

| | | | |
|---|---|---|---|
| 2008/0192431 A1 | 8/2008 | Bechtolsheim | |
| 2008/0209114 A1 | 8/2008 | Chow et al. | |
| 2008/0222406 A1 | 9/2008 | Tabuchi | |
| 2008/0235425 A1 | 9/2008 | Belmar et al. | |
| 2008/0239687 A1 | 10/2008 | Leigh et al. | |
| 2008/0239945 A1 | 10/2008 | Gregg | |
| 2008/0259555 A1 | 10/2008 | Bechtolsheim et al. | |
| 2008/0263246 A1 | 10/2008 | Larson et al. | |
| 2008/0270853 A1 | 10/2008 | Chagoly et al. | |
| 2008/0288661 A1 | 11/2008 | Galles | |
| 2008/0310181 A1 | 12/2008 | Gurevich et al. | |
| 2009/0070760 A1 | 3/2009 | Khatri et al. | |
| 2009/0125666 A1 | 5/2009 | Freking et al. | |
| 2009/0144462 A1 | 6/2009 | Arndt et al. | |
| 2009/0144731 A1 | 6/2009 | Brown et al. | |
| 2009/0182966 A1 | 7/2009 | Greiner et al. | |
| 2009/0182969 A1 | 7/2009 | Norgaard et al. | |
| 2009/0210527 A1 | 8/2009 | Kawato | |
| 2009/0210646 A1 | 8/2009 | BAuman et al. | |
| 2009/0222814 A1 | 9/2009 | Astrand | |
| 2009/0234987 A1 | 9/2009 | Lee et al. | |
| 2009/0240849 A1 | 9/2009 | Corneli et al. | |
| 2009/0249039 A1 | 10/2009 | Hook et al. | |
| 2009/0276551 A1 | 11/2009 | Brown et al. | |
| 2009/0276773 A1 | 11/2009 | Brown et al. | |
| 2009/0276774 A1 | 11/2009 | Kinoshita | |
| 2009/0328035 A1 | 12/2009 | Ganguly | |
| 2010/0005234 A1 | 1/2010 | Ganga et al. | |
| 2010/0027559 A1 | 2/2010 | Lin et al. | |
| 2010/0077117 A1 | 3/2010 | Asnaashari | |
| 2010/0115329 A1 | 5/2010 | Tanaka et al. | |
| 2010/0131359 A1 | 5/2010 | Ting et al. | |
| 2010/0146089 A1 | 6/2010 | Freimuth et al. | |
| 2010/0157463 A1 | 6/2010 | Arizono et al. | |
| 2010/0211714 A1 | 8/2010 | LePage | |
| 2010/0312894 A1 | 12/2010 | Awad et al. | |
| 2011/0029696 A1 | 2/2011 | Uehara | |
| 2011/0029734 A1 | 2/2011 | Pope et al. | |
| 2011/0131359 A1 | 6/2011 | Pettey et al. | |
| 2011/0219161 A1 | 9/2011 | Deshpande et al. | |
| 2011/0258352 A1 | 10/2011 | Williams et al. | |
| 2011/0265134 A1 | 10/2011 | Jaggi et al. | |
| 2011/0317351 A1 | 12/2011 | Pizzolato et al. | |
| 2011/0320602 A1 | 12/2011 | Carlson et al. | |
| 2011/0320653 A1 | 12/2011 | Lais et al. | |
| 2011/0320666 A1 | 12/2011 | Gregg et al. | |
| 2011/0320670 A1 | 12/2011 | Bayer et al. | |
| 2011/0320674 A1 | 12/2011 | Gregg et al. | |
| 2011/0320675 A1 | 12/2011 | Gregg et al. | |
| 2011/0320703 A1 | 12/2011 | Craddock et al. | |
| 2011/0320796 A1 | 12/2011 | DeCusatis et al. | |
| 2011/0320861 A1 | 12/2011 | Bayer et al. | |
| 2011/0320887 A1 | 12/2011 | Craddock et al. | |
| 2011/0320892 A1 | 12/2011 | Check et al. | |

FOREIGN PATENT DOCUMENTS

| | | |
|---|---|---|
| JP | 6279557 | 4/1987 |
| JP | 0553973 | 3/1993 |
| WO | WO9600940 | 11/1996 |
| WO | 2009027189 A1 | 3/2008 |

OTHER PUBLICATIONS

J. Regula, "Using Non-transparent Bridging in PCI Express Systems", PLX Technology, Inc., pp. 1-31; Published: Jun. 1, 2004.
Jack Regula; "Ethernet Tunneling through PCI Express Inter-Processor Communication, Low Latency Storage IO Source"; www.wwpi.com; publisher: Computer Technology Review; Jan. 19, 2009.
Robert F. Kern, "IBM System z & DS8000 Technology Synergy", IBM ATS Americas Disk Storage; Jul. 21, 2009, pp. 1-25.
Szwed et al.; "Managing Connected PCI Express Root Complexes"; Dated: Dec. 23, 2009—6 pages.
U.S. Appl. No. 12/821,221, Final Office Action mail date Jun. 15, 2011.
U.S. Appl. No. 12/821,124, filed Jun. 23, 2010.
U.S. Appl. No. 12/821,181, filed Jun. 23, 2010.
U.S. Appl. No. 12/821,182, filed Jun. 23, 2010.
U.S. Appl. No. 12/821,185, filed Jun. 23, 2010.
U.S. Appl. No. 12/821,191, filed Jun. 23, 2010.
U.S. Appl. No. 12/821,648, filed Jun. 23, 2010.
Z/Architecture Principles of Operation, Feb. 2009; pp. 1-1344.
Non Final Office Action May 8, 2012 for U.S. Appl. No. 12/821,243, filed Jun. 23, 2010.
Non Final Office Action Mar. 15, 2012 for U.S. Appl. No. 12/821,242, filed Jun. 23, 2010.
Non Final Office Action May 4, 2012 for U.S. Appl. No. 12/821,256, filed Jun. 23, 2010.
International Search Report for PCT/EP2011/059810, Sep. 14, 2011.
Final Office Action Mar. 2, 2012 for U.S. Appl. No. 12/821,221.
PCI Express Base Specification Rev 1.0a, Apr. 15, 2003 p. 1-2, 31, 35-36, 43-44, 49-51, 55, 59-62, 74, 101.
U.S. Appl. No. 12/821,221, filed Jun. 23, 2010.
U.S. Appl. No. 12/821,224, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,242, filed Jun. 23, 2010.
U.S. Appl. No. 12/821,243, filed Jun. 23, 2010.
U.S. Appl. No. 12/821,245, filed Jun. 23, 2010.
U.S. Appl. No. 12/821,247, filed Jun. 23, 2010.
U.S. Appl. No. 12/821,248, filed Jun. 23, 2010.
U.S. Appl. No. 12/821,250, filed Jun. 23, 2010.
U.S. Appl. No. 12/821,256, filed Jun. 23, 2010.
U.S. Appl. No. 12/821,271, filed Jun. 23, 2010.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.
Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages. 892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/6969/<retrieved on Jan. 26, 2010>.
K. Vaidyanathan et al.; "Exploiting RDMA Operations for Providing Efficient Fine-Grained Resource Monitoring in Cluster-Based Servers"; Jun. 2006; pp. 10; Downloaded: Apr. 13, 2010 at 18:53:46 UTC from IEEE Xplore. 1-4244-0328-6/06.
Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers-USENIX Annual Teleconference (No. 98); Entitled: "General Purpose Operating System Support For Multiple Page Sizes" 1998; pp. 1-9.
Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
Swift, Michael M. et al., "Improving the Reliability of Commodity Operating Systems," ACM Transactions on Computer Systems, vol. 23, No. 1, Feb. 2005, pp. 77-110.
Talluri, et al., "A New Page Table for 64-bit Address Spaces," ACM SIGOPS Operating Systems Review, vol. 29, Issue 5 (Dec. 1995), pp. 194-200.
VTdHowTo—Xen Wiki; Downloaded—Apr. 16, 2010; pp. 1-5; http://wiki.xensource.com/xenwiki/VTdHowTo.
Winwood, Simon, et al., "Multiple Page Size Support in the Linux Kernel", Proceedings of Ottawa Linux Symposium, 2002.

Xu, Min et al., "Towards a VMM-based Usage Control Framework for OS Kernel Integrity Protection," SACMAT '07, Jun. 20-22, 2007, Sophia Antipolis, France, pp. 71-80.

z/VM: Running Guest Operating Systems, IBM Publication No. SC24-5997-02, Oct. 2001.

Final Office Action dated Aug. 3, 2012 for U.S. Appl. No. 12/821,245.

Non-final Office Action dated Jun. 5, 2012 for U.S. Appl. No. 12/821,221.

Final Office Action dated Jul. 19, 2012 for U.S. Appl. No. 12/821,250.

Non-final office Action received for U.S. Appl. No. 12/821,239 dated Nov. 8, 2012.

Final Office Action received Oct. 10, 2012 for U.S. Appl. No. 12/821,221.

Non-final Office Action received Oct. 11, 2012 for U.S. Appl. No. 12/821,247.

Non-final Office Action dated Sep. 26, 2012 for U.S. Appl. No. 12/821,243.

Final Office Action dated Sep. 13, 2012 for U.S. Appl. No. 12/821,256.

Notice of Allowance dated Sep. 19, 2012 for U.S. Appl. No. 12/821,224.

* cited by examiner

OPTICAL

ELECTRICAL

SPREAD SPECTRUM WIRELESS COMMUNICATION CODE FOR DATA CENTER ENVIRONMENTS

BACKGROUND

Exemplary embodiments relate generally to data centers, and more particularly, to wireless communication for data centers.

A data center or datacenter, also called a server farm, is a facility used to house computer systems and associated components, such as telecommunications and storage systems. It generally includes redundant or backup power supplies, redundant data communications connections, environmental controls (e.g., air conditioning, fire suppression, etc.), and security devices.

BRIEF SUMMARY

An exemplary embodiment includes a device. The device and another device perform operations in a data center. The device is configured to wirelessly transmit management data without cables in the data center. The device includes memory for storing a program and a processor, functionally coupled to the memory, the processor is responsive to computer-executable instructions contained in the program. The processor is operative to obtain management data at the device in the data center and to generate a wireless management data signal from the management data. The processor is operative to configure the wireless management data signal to be transmitted at frequencies matching an ambient electromagnetic noise emitted by the data center, such that the wireless management data signal is masked in the ambient electromagnetic noise emitted by the data center. The processor is operative to transmit the wireless management data signal to the other device.

Another exemplary embodiment includes a data center. Equipment includes storages devices, routers, switches, and/or servers dedicated for sole use in the data center. Other equipment includes other storage devices, other routers, other switches, and/or other servers dedicated for sole use in the data center. The equipment being configured for obtaining management data of the equipment in the data center and generating a wireless management data signal from the management data. The equipment configures the wireless management data signal to be transmitted at frequencies matching an ambient electromagnetic noise emitted by the data center, such that the wireless management data signal is masked in the ambient electromagnetic noise emitted by the data center. The equipment wirelessly transmits the wireless management data signal to the other equipment such that cables normally communicating the management data are removed.

Additional features and details are realized through the techniques of the present invention. Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

In a data center environment, exemplary embodiments provide wireless security by embedding a management data signal in ambient data center noise. Exemplary embodiments may utilize a hybrid of spread spectrum and frequency hopping to transmit and receive management data within the spectrum of the ambient noise of the data center in place of transmitting the management data over cables.

Data centers contain many miles of cabled networks, both optical fiber and copper. The growing complexity of these networks means that they are increasingly likely to fail, disrupting communication between servers and storage devices. Cable congestion also brings with it other issues. For example, cable congestion significantly increases management and installation overhead, makes air cooling more difficult by obstructing ventilation space in densely populated racks and under-floor plenums, and in some cases limits the physical location of equipment and access to the equipment. FIGS. 1A, 1B, 1C, and 1D are simplified examples of the many cables connected to various devices in a data center. FIGS. 1A, 1B, 1C, and 1D are only a snapshot of cable congestion issues, and cable congestion issues may be exacerbated for larger data centers, as understood by one skilled in the art.

Although high bandwidth applications may continue to demand cable interconnect solutions, in addressing the congestion and failure rate issues, exemplary embodiments construct a short-range, wireless network for use in management and/or sideband communications (sideband communication refers to an additional data communication channel for use by non-critical or supplemental data). Also, exemplary embodiments can be utilized for limited data transfer of more than management data in an emergency, and/or to trigger an emergency reboot/power off. This approach may also enable the use of some mobile devices to inventory and manage the data center.

Exemplary embodiments are configured to provide high security to protect sensitive management information in-flight on the wireless link, particularly in enterprise applications. Further, exemplary embodiments are designed to operate within the constraints of an enterprise data center and meet Federal Communications Commission (FCC) requirements in North America. Exemplary embodiments are configured to meet the International Special Committee on Radio Interference (CISPR), which are International standards concerning EMC that are primarily developed by the International Electrotechnical Commission (IEC) and the International Special Committee on Radio Interference (CISPR). Exemplary embodiments are also configured to meet requirements worldwide for conducted and radiated emissions and apply to other national standards such as VDE in Germany). For these reasons, a standard wireless network interface card (NIC) card such as in a laptop computer or notebook is insufficient for this application.

Figure 1A:
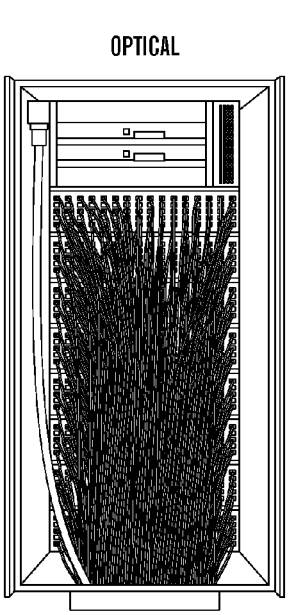
FIGS. 1A, 1B, 1C, and 1D depict the many cables connected to various devices in a data center.
Figure 1B:
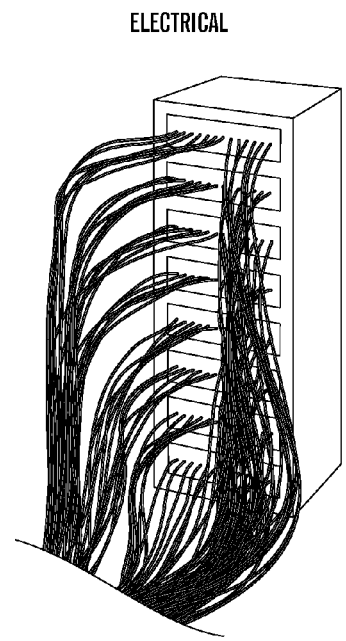
Figure 1C:
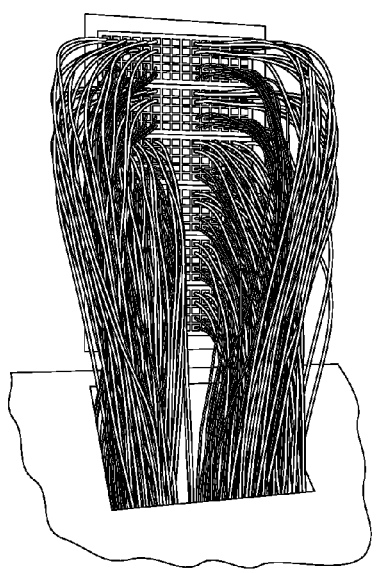
Figure 1D:
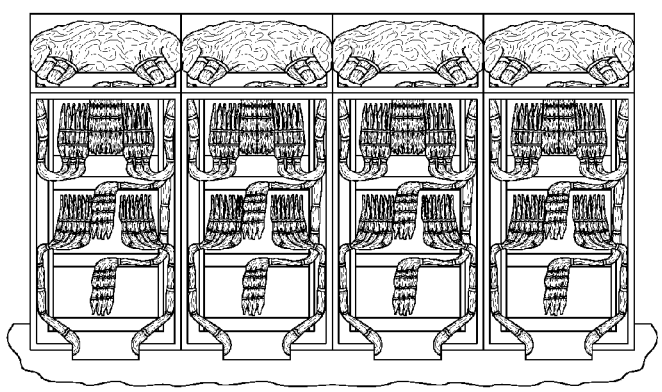
Figure 2:
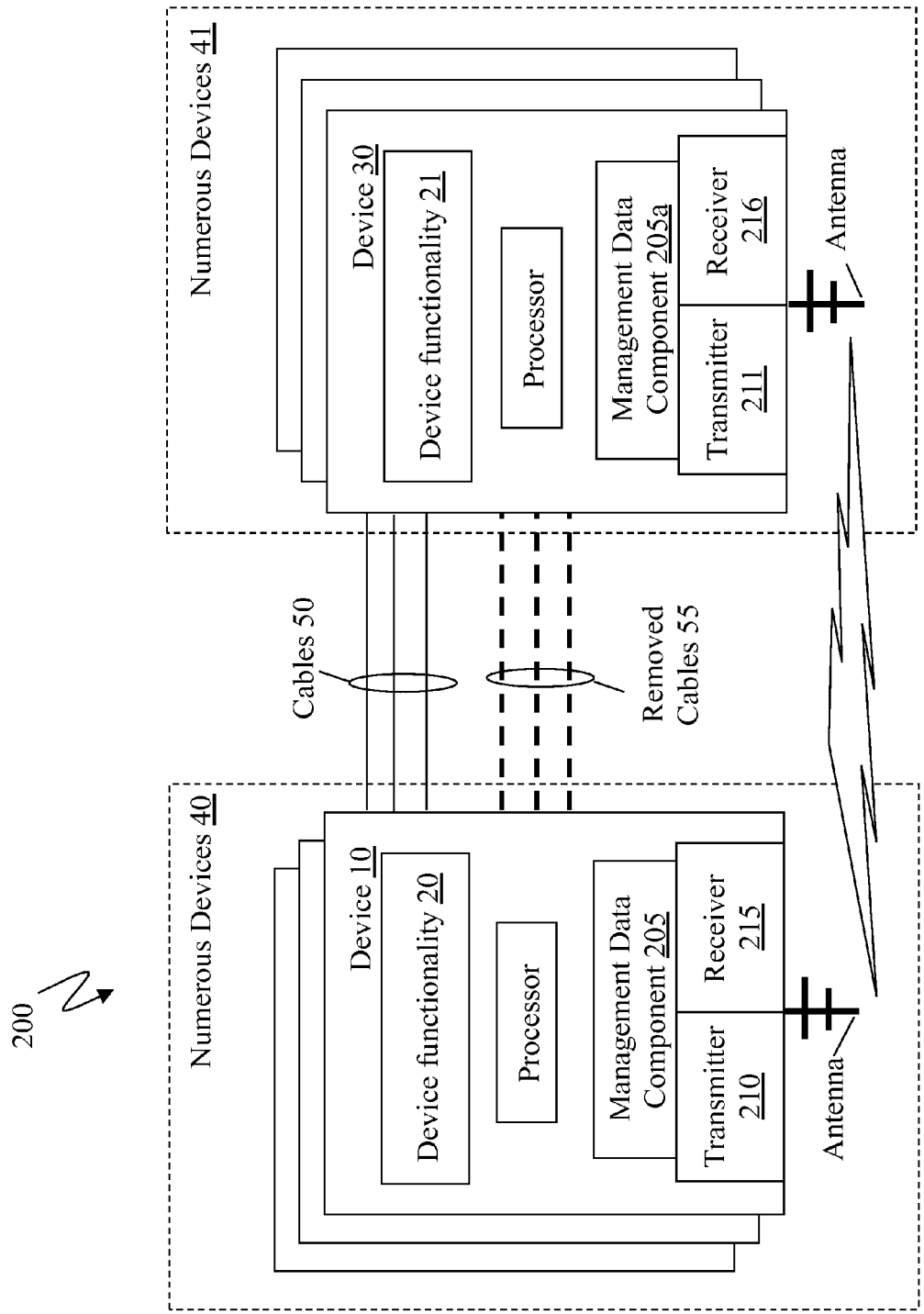
FIG. 2 illustrates a data center in accordance with exemplary embodiments.

FIG. 2 illustrates a data center 200 in accordance with exemplary embodiments. The data center 200 includes a new type of wireless management interface implemented in the management data component 205 and 205a based on spread spectrum encoding wireless management data for transmission and reception in the data center 200 with inherent resistance to eavesdropping. The management data components 205 and 205a are also designed to automatically configure and wirelessly transmit wireless management data signals (shown in FIG. 3) to comply with industry standards for conducted and radiated noise within the data center 200, such as FCC and/or CSPIR requirements.

As understood by one skilled in the art, the data center 200 may include numerous types of devices running in the data center 200. For illustration, the numerous devices of the data center 200 are represented as numerous devices 40 and numerous devices 41. One of the many devices of the numerous devices 40 is a device 10 and one of the many devices of the numerous devices 41 is a device 30. The devices 40 and 41 can represent any type of computing device, such as servers, routers, switches, storage devices, power supplies, computers, air cooling systems, etc.; the functionality of the particular type of device 10 is represented as device functionality 20 and the functionality of the particular type of device 30 is represented as device functionality 21. For the sake of brevity, it is noted that one skilled in the art understand the functionality (represented by device functionality 20 and 21) of servers, routers, switches, storage devices, power supplies, computers, air cooling systems, etc. Also, the devices 10 and 30 include memory and one or more processors for running computer executable instructions.

The management data components 205 and 205a may be identical and include software and hardware components for implementing exemplary embodiments. In device 10, features of the management data component 205 may be partially or completely implemented in and/or coupled to a transmitter 210 for transmitting signals related to management data and a receiver 215 for receiving signals related to management data via an antenna. Likewise, in device 30, features of the management data component 205 may be partially or completely implemented in and/or coupled to a transmitter 211 for transmitting signals related to management data and a receiver 216 for receiving signals relate to management data via an antenna. In the data center 200, the management data components 205 and 205a along with the transmitters 210 and 211 and the receivers 215 and 216 are meant to be represented throughout the numerous devices 40 and 41, although not shown for the sake of clarity. The numerous devices 40 and 41 are located in the data center 200 and operate to support the data center 200 as understood by one skilled in the art.

Figure 3:
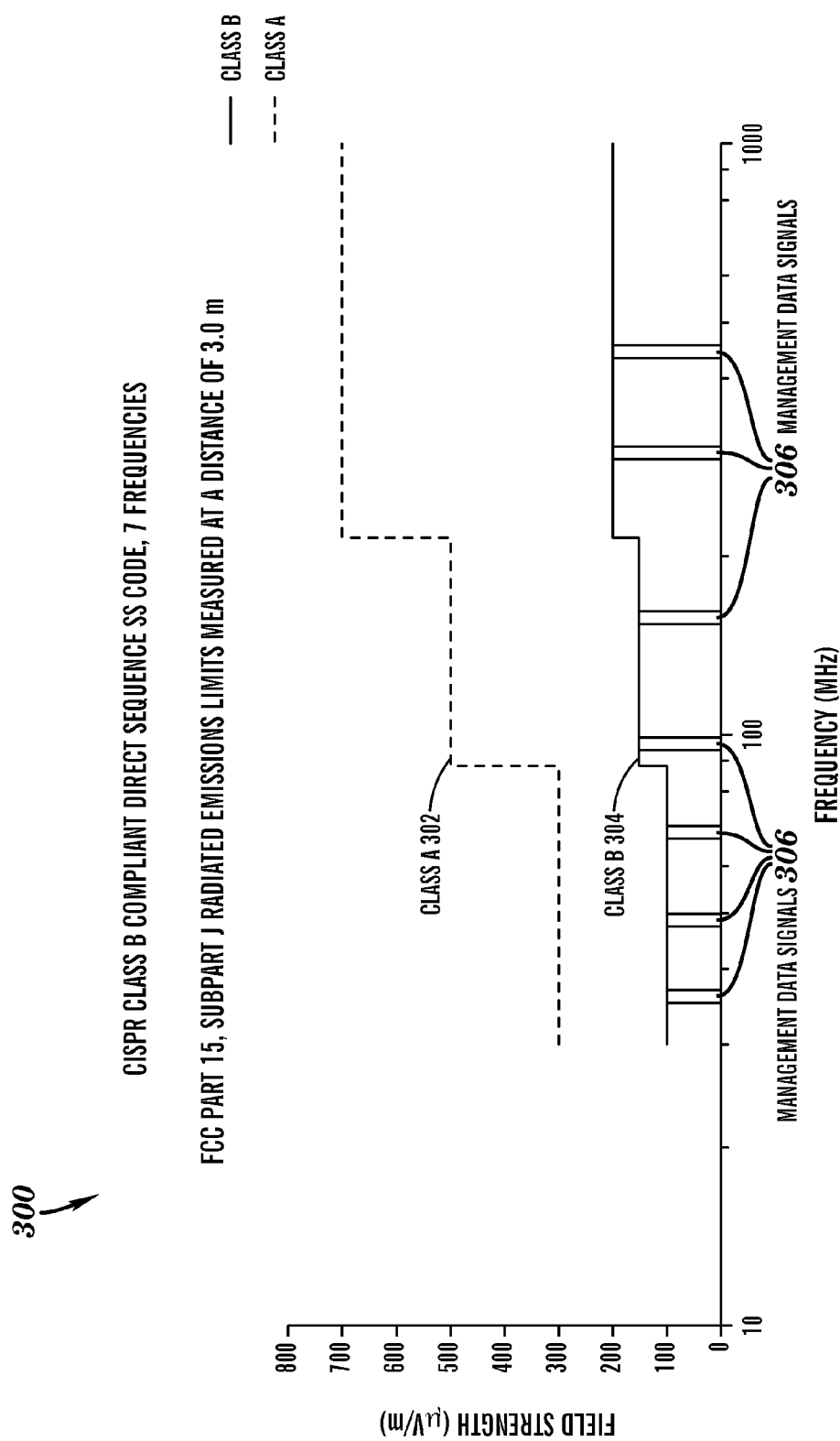
FIG. 3 illustrates a graph in accordance with exemplary embodiments.

The numerous devices 40 and 41 are connected by multiple cables 50 and in a typical data center, the numerous devices 40 and 41 would also be connected by removed cables 55. Although the removed cables 50 normally connect many different devices in numerous devices 40 to many different numerous devices in numerous device 41, the following explains the removed cables 55 with respect to devices 10 and 30 but applies to all the numerous devices 40 and 41. As a scenario, the device 10 may represent one or more racks of different devices (such as servers, routers, switches, storage devices, and other operating equipment in the data center 200 as understood by one skilled in the art) in the data center 200 operatively connected via the cables 50 and the removed cables 55 to the device 30 which may represent one or more racks of different devices (such as servers, routers, switches, storage devices, and other operating equipment in the data center 200 as understood by one skilled in the art). In a typical setup, the removed cables 55 are physically connected between the device 10 and device 30 and are utilized as a physical medium to transmit management data between the device 10 and device 30 (which are representative of racks of equipment). However, by utilizing the management data components 205 and 205a, the removed cables 55 are removed (i.e., no longer present or needed) and shown as dashed lines because the management data is now being wirelessly transmitted by the management data signals 306 between the device 10 and device 30 by emitting and receiving electrical radiation via the antennas. In the data center 200, since there are many different numerous devices 40 including the device 10 and many different numerous device 41 including the device 30 all being previously connected removed cables 55 to transmit and receive management data, the removal of the removed cables 55 creates more space for airflow between the numerous devices 40 and 41 in the datacenter 200, more space for device/equipment inspection, and more space for device/equipment repair because the management data is now being wirelessly transmitted and received over the airways by the management data components 205 and 205a as wireless management data signals 306, as shown in FIG. 3 which is a graph 300 illustrating FCC radiated emissions limits measured at a distance of 3 meters and management data signals 306 in accordance with exemplary embodiments. Although not shown for clarity, there are cables interconnecting devices within the numerous devices 40, and any cables carrying management data can be removed just as the removed cables 55 are removed. Likewise, there are cables interconnecting devices within the numerous devices 41, and any cables carrying management data can be removed just as the removed cables 55 are removed.

Now turning to an example, the management data may be input (and/or obtained) from the device functionality 20 into the management data component 205, and utilizing the input management data the management data component 205 is configured to automatically generate wireless management data signals 306 for wireless transmission to the receiver 216 of the device 30. The management data component 205 is configured to automatically generate the wireless management data signals 306 to meet (i.e., be under) FCC radiated emissions limits for the class B emission requirements 304 in FIG. Likewise, the management data component 205a (which comprises identical features as the management data component 205) is configured to automatically generate and transmit wireless management data signals 306 to the receiver 215 of device 10, and the transmitted wireless management data signals 306 meet FCC radiated emissions limits for the class B emission requirements 304. As an example, management data in a data center may include data which reports when a piece of data center equipment (e.g., server, storage, and/or network switch) is not functioning properly and needs to be replaced. Management data may also include data which specifies the desired configuration of a server, switch, and/or storage device by defining attributes such as security access control lists, desired network configurations between a data source and its destination, number and size of virtual partitions in a server, switch, and/or storage device, and similar properties of the data center equipment.

Further with regard to FCC requirements in the graph 300 in FIG. 3, the y-axis shows the field strength in microvolts (uv) per meter (m), and the x-axis shows the frequency in megahertz (Mhz). The graph 300 shows a class A emission requirement 302 and the class B emission requirement 304. The wireless management data signals 306 are superimposed on the graph 300.

Many other communication devices such as cell phones, mobile radios, military communications, or other systems do not meet these FCC requirements shown in FIG. 3 (particularly the class B emission requirement 304), and if these communication devices were deployed next to a computer system in a data center such as the data center 200, these communication devices would fail to meet industry electromagnetic compatibility (EMC) standards for radiated and conducted noise. These electromagnetic compatibility standards are important for several reasons. They are required to comply with international export and domestic shipping regulations, so it is not possible to ship computer equipment worldwide without meeting these compliance standards. Also, high EMC levels may also induce errors in computer equipment or copper wired communication links (i.e., cables 50) in a data center. If EMC levels are very high, there are human factors and safety considerations, including compatibility with pacemakers or other devices. For all these reasons, existing wireless NIC cards are not a viable solution for large scale data center deployments. Accordingly, the management data components 205 and 205a are designed to employ a version of spread spectrum encoding optimized for this type of data center 200 environment which is compatible with existing wireless hardware, depending on details of the desired implementation.

The management data components 205 and 205a are configured with a spread spectrum communication system that takes advantage of frequency hopping techniques to distribute the energy content of the wireless management data signals 306 over a broad range of frequencies. In the example in FIG. 3, the management data component 205 of the device 10 has spread the wireless management data signals 306 in a random order over 7 different frequencies within the 10-1000 MGhz frequency range, and the receiver 216 of the device 30 is configured to receive the 7 wireless management data signals 306 in the random order in which they are transmitted and at the proper center frequency for each of the 7 wireless management data signals 306. Each divided portion (and/or signal) of the wireless management data signals 306 is transmitted by the transmitter 210 on a different center frequency (i.e., frequency hopping) as seen in FIG. 3. As seen in graph 300, the amplitude of the management data signals 306 is clipped to be at and/or below the line for the class B emission requirement 304. To the casual eavesdropper, the wireless management data signals 306 appear to be masked by broadband ambient radio frequency (RF) noise of the data center 200. However, the properly tuned wireless receivers 215 and 216 can follow the frequency hopping code and extract the useful management data out of the wireless management data signal 306.

Most of the ambient background RF noise in a data center such as the data center 200 is radiated within a frequency range between 10-1000 MHz, and the data center 200 operates under the radiated electromagnetic limits of the class B emission requirements 304; as well, the management data components 205 and 205a configure the spread spectrum code of the management data signals 306 to operate under the class B emission requirements 304 of this same frequency range (10-1000 MHz) to avoid standing out from the ambient background RF noise of the data center 200 and thus provide an inherent level of security. Within this frequency range of 10-1000 MHz, the FCC noise limits are depicted in FIG. 3, particularly the class B emission requirement 304. Based on utilizing this technique, the management data components 205 and 205a may be configured to implement a method for encoding the management data which comprises automatically changing the wireless transmission frequency (e.g., the center frequencies) of the wireless management data signals 306, changing the duration which the wireless management data signals 306 spends at a given frequency, changing the amplitude of the signal components of the wireless management data signals 306, and/or a combination of the above. This implementation of exemplary embodiments in graph 300 illustrates changes in both signal center frequency and amplitude of the wireless management data signals 306, since these are the parameters which can provide compliance with radiated noise limits. The resulting hybrid of direct sequence spread spectrum and frequency hopping spread spectrum is accepted under the Institute of Electrical and Electronics Engineers (IEEE) wireless Ethernet standard 802.11.

Figure 4:
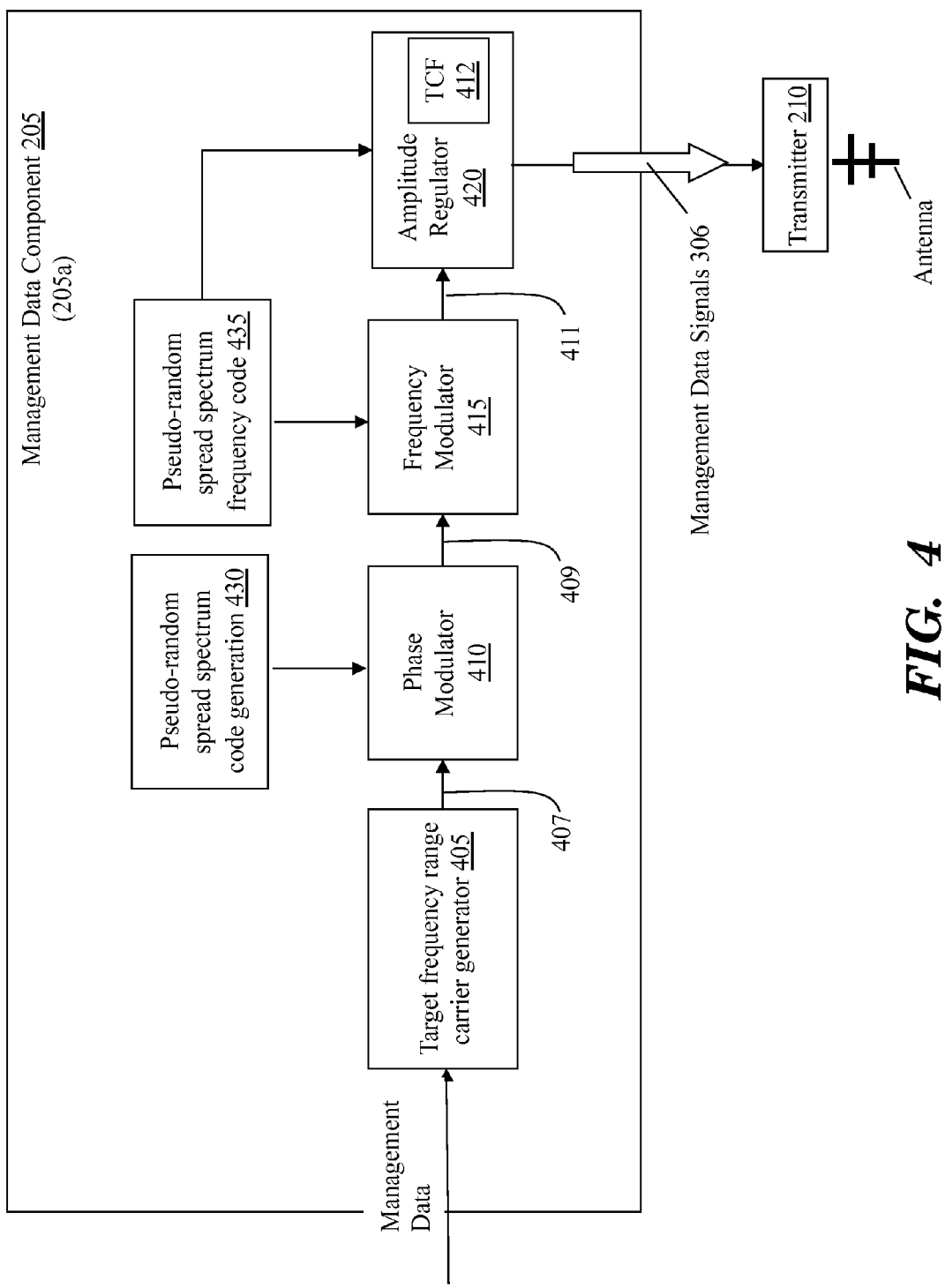
FIG. 4 illustrates management data components in accordance with exemplary embodiments.

Now turning to FIG. 4 which shows an example implementation, FIG. 4 illustrates details of the management data component 205 and 205a in accordance with exemplary embodiments. FIG. 4 is explained with reference to management data component 205 but applies to management data component 205a.

The management data component 205 receives (and/or obtains) the management data from, e.g., the device functionality 20 and/or any other software/hardware component of the device 10. A target frequency range carrier generator 405 modulates the management data onto center carrier signals in the target frequency range to output signal 407. The target frequency range carrier generator 405 is configured to generate, e.g., 7 different target carrier center frequencies for modulating (and splitting up) the management data onto a frequency range (e.g., the 10-1000 MHz range) that is within the electromagnetic radiation emission (i.e., noise) emitted by the numerous devices 40 and 41 operating in the data center 200. The electromagnetic radiation emissions (noise) emitted by the numerous devices 40 and 41 operating in the data center 200 naturally occurs when the numerous devices 40 and 41 run, and the electromagnetic radiation emissions comprise the sum total of all emissions when, e.g., the servers, storage devices, switches, routers, etc., operate as understood by one skilled in the art. If the electromagnetic radiation emission of the data center 200 changes, such as the data center 200 emits electromagnetic radiation at higher frequencies, emits electromagnetic radiation at lower frequencies, emits electromagnetic radiation within a smaller frequency range, and/or emits radiation within a larger frequency range, the target frequency range carrier generator 405 is configured to automatically modify the target frequency range of the carrier signals to match the changed electromagnetic radiation emission emitted by the data center 200. For example, if the electromagnetic radiation noise of the data center 200 changes from the previous frequency of 10-1000 MHz to the frequency range of 100-500 MHz, the target frequency range carrier generator 405 is configured to accordingly generate the 7 different target carrier center frequencies within the frequency range of 100-500 MHz, such that the 7 different target carrier center frequencies (which will eventual be management data signals 306) are wirelessly transmitted in the frequency range of 100-500 Mhz, thus being masked by the electromagnetic noise of the data center 200. Although examples utilize 7 different target carrier center frequencies for explanation purposes, it is understood that fewer such as, e.g., 3-6 target carrier center frequencies and/or more such as, e.g., 8-15 target carrier center frequencies may be utilized by the target frequency range carrier generator 405. This signal 407 is passed to a phase modulator 410.

The phase modulator 310 receives, includes, and/or generates pseudo-random spread spectrum code 430 (which are direct sequence spread spectrum code symbols). The phase modulator 410 phase modulates the signal 407 with the continuous stream of pseudo-random spread spectrum code 430 also called "chips", each of which has a duration much smaller than an information bit of the management data. Therefore, the chip rate is much higher than the information signal bit rate of the management data, and the encoding rate of the pseudo-random spread spectrum code 430 is much faster than the actual bit rate of the management data. This has the effect of broadening the signal bandwidth (i.e., direct sequence spread spectrum) of the signal 407 resulting in the signal 409. In other words, each of the signals of the management data signals 306 are spread wider than their respective center frequency by the pseudo-random spread spectrum code 430. Also, note that (the signal structure of) the pseudo-random spread spectrum code 430 (i.e., chips) are known a priori by the receiver 216. The receiver 216 can then use the same pseudo-random spread spectrum code 430 to reconstruct the management data (from the eventually received wireless management data signal 306).

A frequency modulator 415 receives the signal 409, and the frequency modulator 415 receives, includes, and/or generates pseudo-random spread spectrum frequency code 435. The frequency modulator 415 modulates a series of pseudo-random bits of the pseudo-random spread spectrum frequency code 435 onto the carrier center frequencies of the signal 409 to re-tune the signal 409. As such, each of the 7 target carrier frequencies has a center frequency according to the pseudo-random spread spectrum frequency code 435. Of the 7 target carrier center frequencies of the signal 409, the frequency modulator 415 utilizes the pseudo-random spread spectrum frequency code 435 to determine which of the 7 target carrier center frequencies to transmit on first, second, third, fourth, fifth, sixth, and seventh. In other words, the frequency modulator 415 configures the order of the frequency hopping for the signal 409 to know which center frequency to transmit from start to finish. Also, note that the receiver 216 knows the pseudo-random spread spectrum frequency code 435 in advance, such that the receiver 216 can reconstruct the management data (from the eventually received wireless management data signals 306).

The frequency modulator 415 outputs signal 411, and the signal 411 is received by the amplitude (clipper) regulator 320 along with the pseudo-random spread spectrum frequency code 435. To generate the wireless management data signals 306, the amplitude regulator 420 clips the signal amplitude of the signal 411 based on a transmission control function 412, which limits the amplitude at each given center frequency to a level at and/or below the radiated noise limits (this allows for some margin in the design), e.g., of the FCC class B emission requirements 304. For example, based on the first center frequency location relative to the class B emission requirements 304 the first center frequency may be clipped to have an amplitude A, based on the second center frequency location in the class B emission requirements 304 the second center frequency may be clipped to have an amplitude B, based on the third center frequency location in the class B emission requirements 304 the third center frequency may be clipped to have an amplitude C, and continuing through to the seventh center frequency, the seventh center frequency may be clipped to have an amplitude G based on the seventh center frequency location relative in the class B emission requirements 304. The amplitude regulator 420 clips each center frequency to ensure that each center frequency does exceed the FCC class B emission requirements at every given frequency (shown in megahertz) in the graph 300. The amplitude regulator 420 is configured to be in phase with the pseudo-random spread spectrum frequency code 435 used to select the center frequency. Also, the transmission control function 412 may be configured to limit the amplitude at a given center frequency to a level at and/or below the electromagnetic radiated noise limits for any international standard and country along with ensuring that the wireless management data signals 306 are masked with the ambient electromagnetic emissions regulations for data centers 200 in that particular country.

The wireless management data signals 306 are then transmitted into free space by the transmitter 210 via the antenna, and the wireless management data signals 306 are undetectable from background electromagnetic noise of the data center 200 using either spectral and/or temporal analysis without knowledge of the two pseudo-random bit sequences (which may be different) of the pseudo-random spread spectrum code 430 and the pseudo-random spread spectrum frequency code 435. The pseudo-random sequence of the pseudo-random spread spectrum code 430 and the pseudorandom sequence of the pseudo-random spread spectrum frequency code 435 are known in advance by the receiver, such as the receivers 215 and 216, making it possible for the receivers 215 and 216 to reconstruct the received management data signals 306. For example, management data components 205 and 205a may provide the pseudo-random spread spectrum code 430 and the pseudo-random spread spectrum frequency code 435 to the respective receivers 215 and 216. Changes to the pseudo-random sequences of the pseudo-random spread spectrum code 430 and the pseudo-random spread spectrum frequency code 435 may be done on a cyclic basis (such as, e.g., changed every 15, 30, 45, etc., minutes; changed every 1, 2, 3 4, etc., hours; changed every 1, 2, 3, 4, etc., days); and/or changed according to some other user-defined requirement.

Exemplary embodiments provide for very high intrinsic levels of security on the wireless link and enable wireless transmission within the data center 200 that by design does not violate radiated emission limits. Variations on this scheme, such as an amplitude clipper 420 which limits signals to some margin below the conducted noise limits, are also possible. The transmission scheme of exemplary embodiments may involve a separate transmitter 215 at each server, and/or allow several servers within a rack or package to combine their status into a common signal such as the management data signal 306. For example, the management data component 205 may receive different management data from several servers within a rack or package. As such, the pseudo-random sequences of the pseudo-random spread spectrum code 430 is configured to encode the management data for each of the several servers differently, such that when the management data signals 306 are transmitted, the receiver 216 (and/or any other respective receivers 216 if being transmitted to separate devices) can demodulate the management data signals 306 (by utilizing the pseudo-random spread spectrum code 430 that initially modulated the several management data of the several servers) to uniquely determine the separate management data for each of the several servers in the rack or package.

For IBM System z®, for example, the wireless management data signals 306 might be transmitted to the receiver 216 of (and report to) a hardware management console (HMC) console. In one implementation, effective range of the wireless management data signals 306 may be inherently limited by the amplitude (clipper) regulator 420 to a few hundred meters, although exemplary embodiments can also conceive of using other server nodes to repeat the management data signals 306 and form a wireless mesh network within the data center 200.

Figure 5:
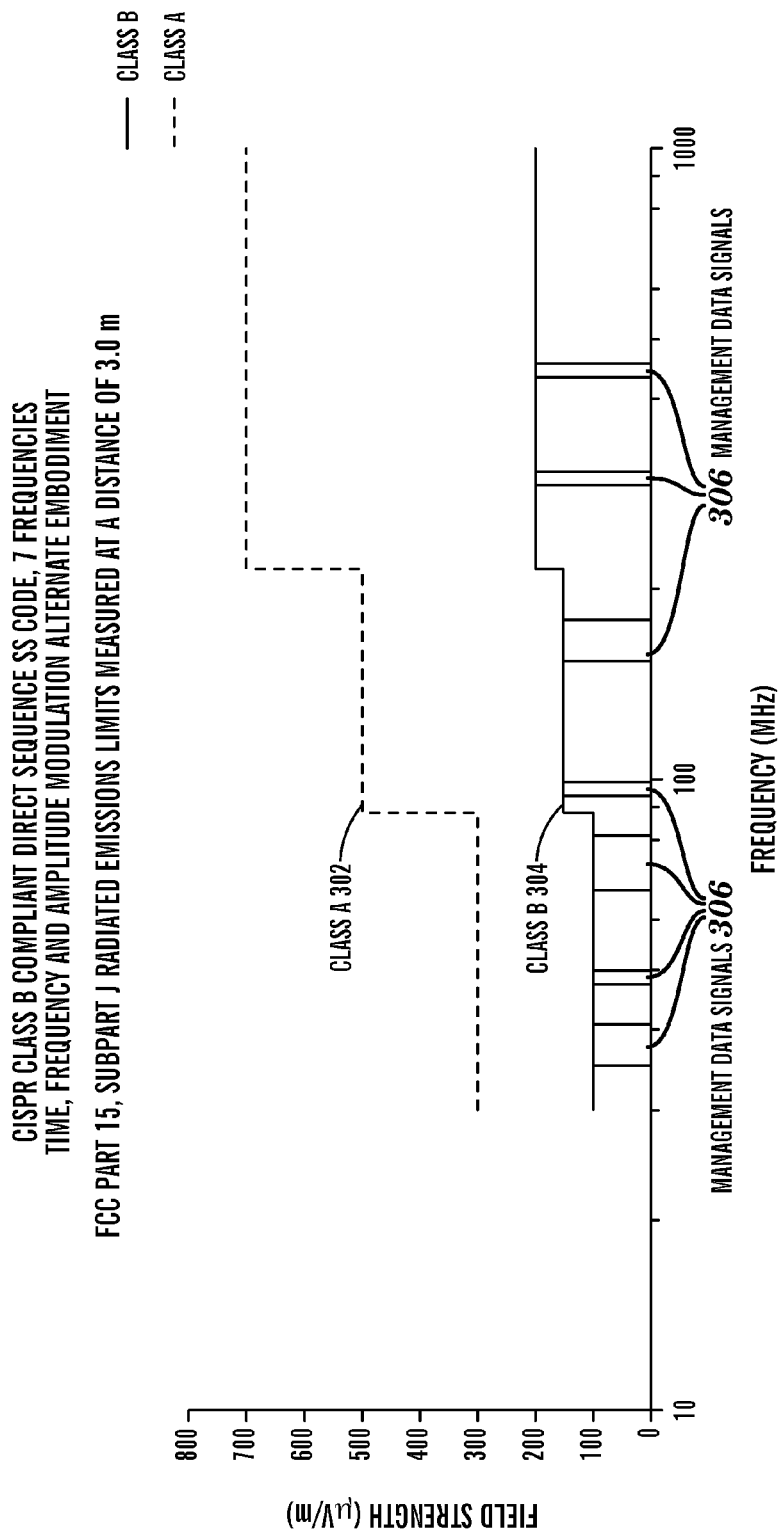
FIG. 5 illustrates a graph depicting a further implementation in accordance with exemplary embodiments.

FIG. 5 illustrates a graph 500 depicting a further implementation in accordance with exemplary embodiments. Similar to the graph 300, the graph 500 shows the y-axis as the field strength in microvolts (uv) per meter (m) and shows the x-axis as the frequency in megahertz (Mhz). The graph 500 shows a class A emission requirement 302 and a class B emission requirement 304. In FIG. 5, the wireless management data signals 306 are modulated by time such that the 7 frequencies of the wireless management data signals 306 are transmitted for varying lengths of time because time is being changed for the 7 different center frequencies. For example, in the management data component 205, either (and/or both) the pseudo-random spread spectrum code 430 and the pseudo-random spread spectrum frequency code 435 can be modified to modulate the length of time that each of the 7 frequencies of the management data signals 306 are being transmitted on by the transmitter 210. Additionally, the management data component 205 may include a separate pseudo-random spread spectrum time code for varying the time at which the each signal of the management data signals 306 is transmitted. The pseudo-random spread spectrum time code may be input in the frequency modulator 415 to provide a length of transmission time for each of the 7 frequencies of the management data signals 306.

Figure 6:
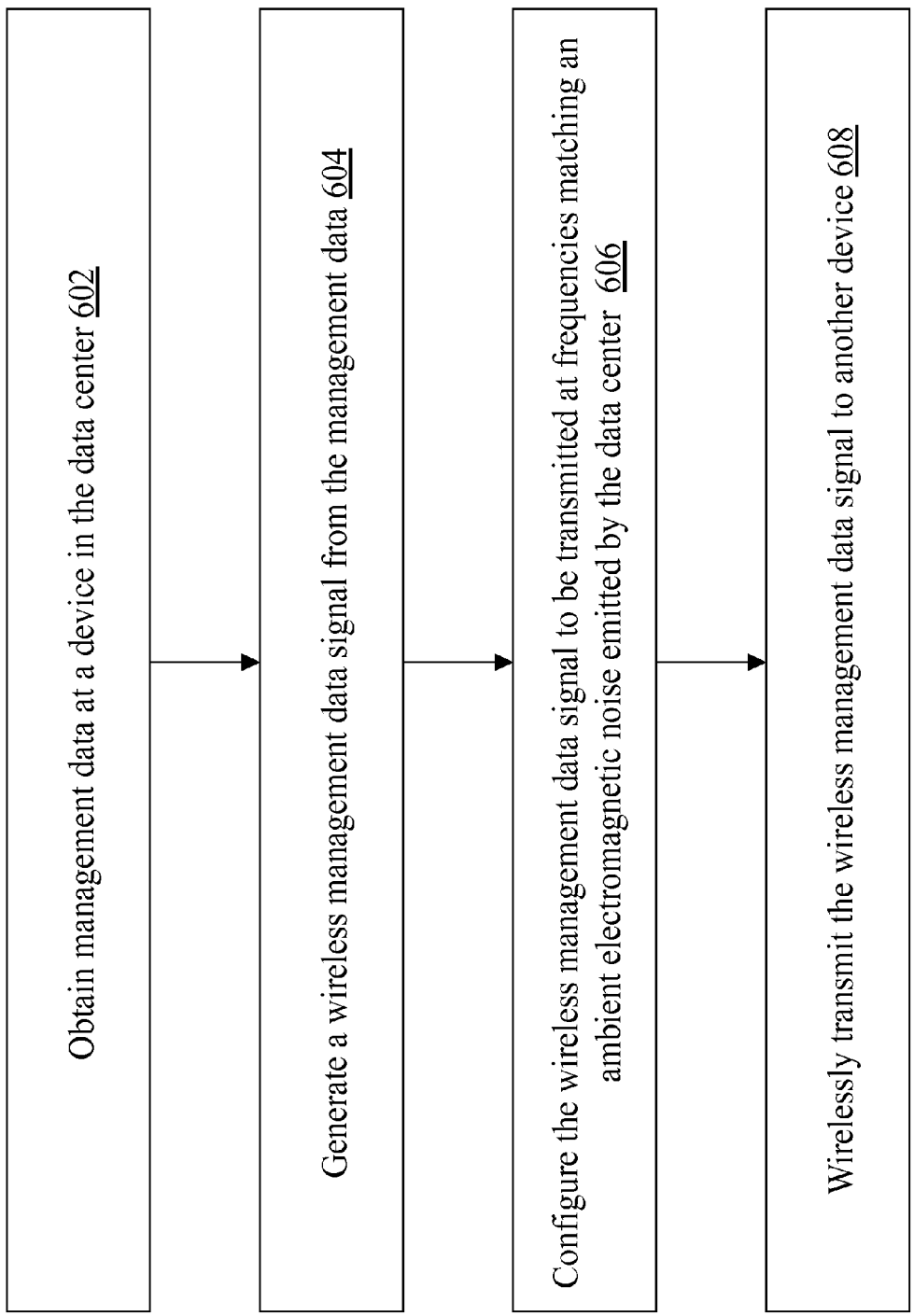
FIG. 6 illustrates a method in accordance with exemplary embodiments.

FIG. 6 illustrates a method for wirelessly transmitting management data without cables in a data center in accordance with exemplary embodiments. At operation 602, a device such as the device 10 in the data center 200 obtains management data.

At operation 604, the management data component 215 generates the wireless management data signals 306 from the management data of the device 10.

At operation 606, the management data component 215 configures the wireless management data signals 306 to be transmitted at frequencies (e.g., 7 different center frequencies) matching an ambient electromagnetic noise emitted by the data center 200, such that the wireless management data signal 306 is masked (i.e., hidden) in the ambient electromagnetic noise naturally emitted by the data center 200.

At operation 608, the device 10 transmits via the transmitter 210 the wireless management data signals 306 to another device, such as the device 20 (via the receiver 216).

Figure 7:
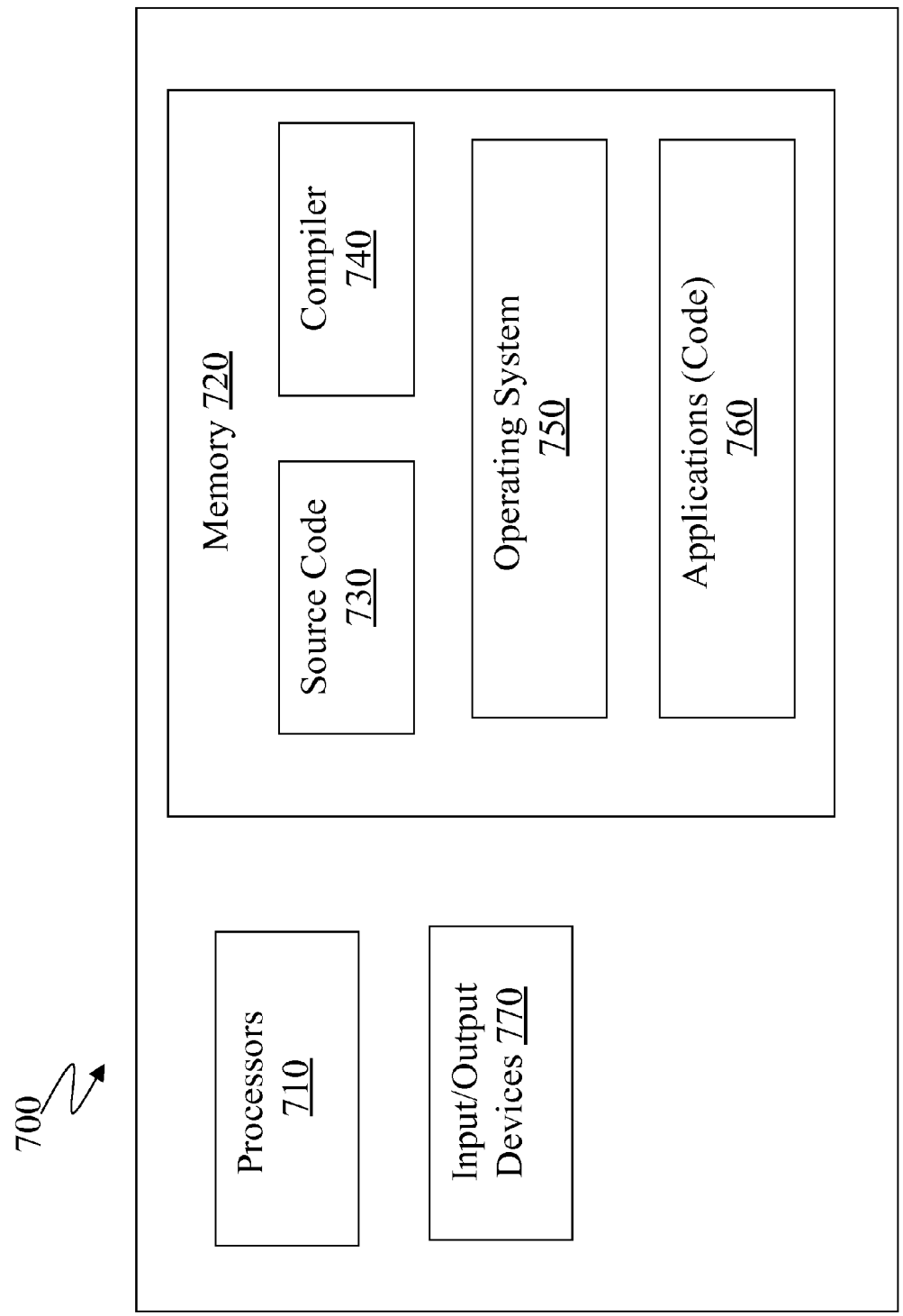
FIG. 7 illustrates a computer utilized to implement exemplary embodiments.

FIG. 7 illustrates an example of a computer 700 having capabilities, which may be included in exemplary embodiments. Various methods, procedures, modules, flow diagrams, tables, and techniques discussed herein may also incorporate and/or utilize the capabilities of the computer 700. Moreover, capabilities of the computer 700 may be utilized to implement features of exemplary embodiments discussed herein. One or more of the capabilities of the computer 700 may implement and/or complement any element discussed herein.

Generally, in terms of hardware architecture, the computer 700 may include one or more processors 710, computer readable storage memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the computer readable memory 720 may include one or more separate programs, each of which comprises an ordered listing of executable instructions for implementing logical functions. The software in the memory 720 includes a suitable operating system (O/S) 750, compiler 740, source code 730, and one or more applications 760 of the exemplary embodiments. As illustrated, the application 760 comprises numerous functional components for implementing the features, processes, methods, functions, and operations of the exemplary embodiments. The application 760 of the computer 700 may represent numerous applications, agents, software components, modules, interfaces, controllers, etc., as discussed herein but the application 760 is not meant to be a limitation. The operating system 750 may control the execution of other computer programs, and provides scheduling, input-output control, file and data management, memory management, and communication control and related services.

The application(s) 760 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction. Further, the application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions.

The I/O devices 770 may include input devices (or peripherals) such as, for example but not limited to, a mouse, keyboard, scanner, microphone, camera, etc. Furthermore, the I/O devices 770 may also include output devices (or peripherals), for example but not limited to, a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or an intranet. The I/O devices 770 may be connected to and/or communicate with the processor 710 utilizing Bluetooth connections and cables (via, e.g., Universal Serial Bus (USB) ports, serial ports, parallel ports, FireWire, HDMI (High-Definition Multimedia Interface), etc.).

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable medium 720 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
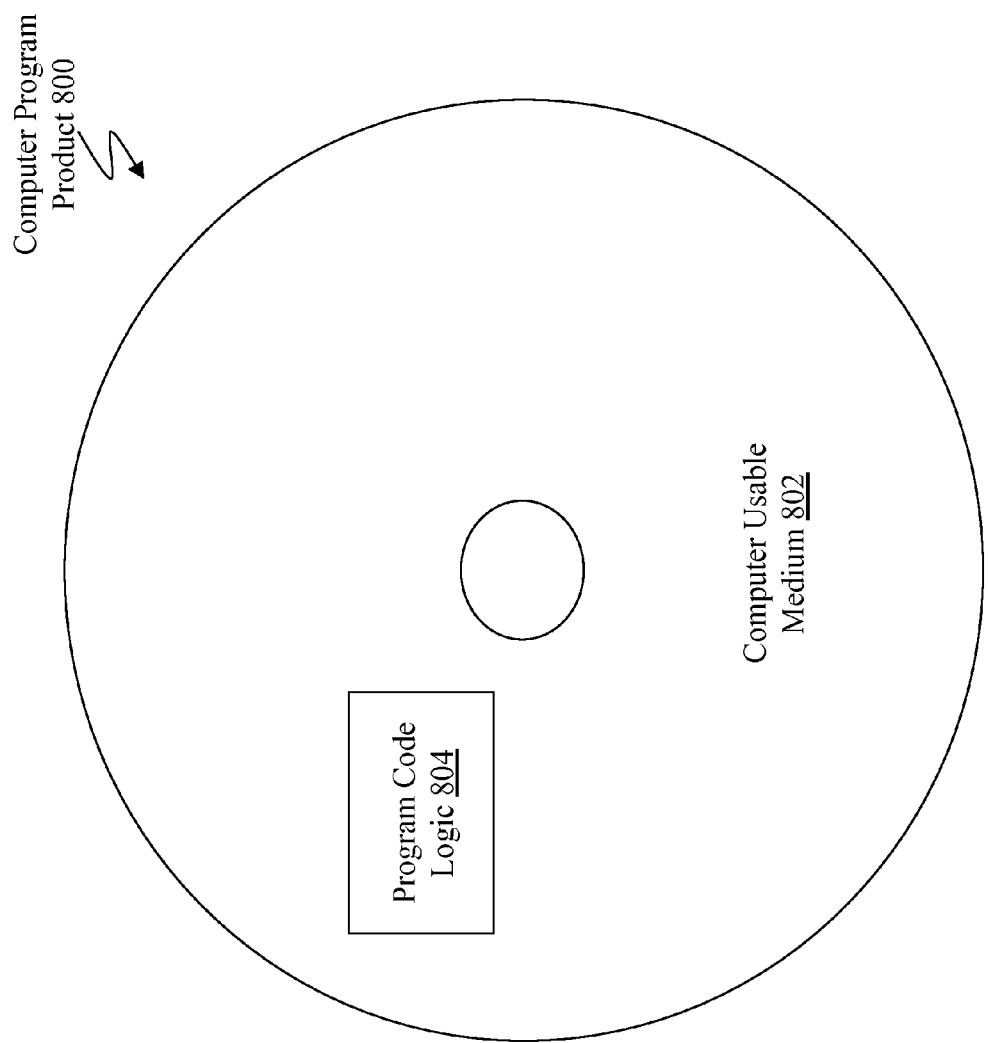
FIG. 8 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 800 as depicted in FIG. 8 on a computer usable medium 802 with computer program code logic 804 containing instructions embodied in tangible media as an article of manufacture. Exemplary articles of manufacture for computer usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A device configured to wirelessly transmit management data to an other device without cables in a data center, where the device and the other device run in the data center, the device comprising:
   memory for storing a program; and
   a processor functionally coupled to the memory, the processor being responsive to computer-executable instructions contained in the program and operative for:
   obtaining management data at the device in the data center;
   generating a wireless management data signal from the management data;
   configuring the wireless management data signal to be transmitted at frequencies matching an ambient electromagnetic noise emitted by the data center, such that the wireless management data signal is masked in the ambient electromagnetic noise emitted by the data center; and
   wirelessly transmitting the wireless management data signal to the other device;
   wherein generating the wireless management data signal from the management data comprises:
   modulating the management data on a plurality of target frequencies for carrier frequencies of the management data, wherein the plurality of target frequencies are within a spectrum of the ambient electromagnetic noise of the data center;
   spreading the management data on the plurality of target frequencies for carrier frequencies to have a larger bandwidth than the management data, while still maintaining the management data on the plurality of target frequencies for carrier frequencies within the spectrum of the ambient electromagnetic noise of the data center;
   randomly selecting an order in which the plurality of target frequencies for carrier frequencies are to be transmitted; and
   clipping an amplitude of the management data on the plurality of target frequencies for carrier frequencies to be within a regulated class.

2. The device of claim 1, wherein the device is at least one of: a server, a switch, a router, and a storage device operating in the data center; and
   wherein the other device is at least one of: a server, a switch, a router, and a storage device operating in the data center.

3. The device of claim 1, wherein the ambient electromagnetic noise emitted by the data center is electromagnetic radiation naturally emitted by various devices operating in the data center.

4. The device of claim 1, wherein the ambient electromagnetic noise of the data center is electromagnetic radiation in a range of 10 megahertz through 1000 megahertz.

5. The device of claim 1, wherein the regulated class is Federal Communication Class B for radiated emissions limits.

6. The device of claim 1, wherein the wireless management data signal comprises a plurality of signals;

wherein each of the plurality of signals is spread to have a wider bandwidth;

wherein each of the plurality of signals is transmitted on different center frequencies at different instances in time until all the plurality of signals are transmitted; and wherein each of the plurality of signals is configured to be transmitted within a frequency range of the ambient electromagnetic noise of the data center.

7. The device of claim 1, wherein when a frequency range of the ambient electromagnetic noise of the data center changes to a new frequency range of the ambient electromagnetic noise of the data center, the plurality of signals are configured to be transmitted within the new frequency range of the ambient electromagnetic noise of the data center.

8. The device of claim 1, wherein the wireless management data signal is masked in the ambient electromagnetic noise emitted by the data center such that when the wireless management data signal is transmitted at the frequencies matching the ambient electromagnetic noise, the wireless management data signal is configured to be undetectable from the ambient electromagnetic noise.

9. A data center, comprising:

equipment including at least one of storage devices, routers, switches, and servers dedicated for sole use in the data center;

other equipment including at least one of other storage devices, other routers, other switches, and other servers dedicated for sole use in the data center; and the equipment being configured for:

obtaining management data of the equipment in the data center;

generating a wireless management data signal from the management data;

configuring the wireless management data signal to be transmitted at frequencies matching an ambient electromagnetic noise emitted by the data center, such that the wireless management data signal is masked in the ambient electromagnetic noise emitted by the data center; and wirelessly transmitting the wireless management data signal to the other equipment such that cables normally communicating the management data are removed;

wherein generating the wireless management data signal from the management data comprises:

modulating the management data on a plurality of target frequencies for carrier frequencies of the management data, wherein the plurality of target frequencies are within a spectrum of the ambient electromagnetic noise of the data center;

spreading the management data on the plurality of target frequencies for carrier frequencies to have a larger bandwidth than the management data, while still maintaining the management data on the plurality of target frequencies for carrier frequencies within the spectrum of the ambient electromagnetic noise of the data center;

randomly selecting an order in which the plurality of target frequencies for carrier frequencies are to be transmitted; and clipping an amplitude of the management data on the plurality of target frequencies for carrier frequencies to be within a regulated class.

10. The data center of claim 9, wherein when the equipment and the other equipment are running in the data center, the equipment and the other equipment emit the ambient electromagnetic noise while performing operations of the data center.

* * * * *